(12) United States Patent  
Mangold et al.

(10) Patent No.: US 7,660,073 B2  
(45) Date of Patent: Feb. 9, 2010

(54) BRACED SUSPENSION FOR SUPPORTING A HEAD SLIDER

(75) Inventors: Markus Erwin Mangold, Minneapolis, MN (US); Sandeepan Bhattacharya, Eagan, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 436 days.

(21) Appl. No.: 11/486,702

(22) Filed: Jul. 14, 2006

(65) Prior Publication Data

US 2008/0013214 A1     Jan. 17, 2008

(51) Int. Cl.
*G11B 5/54* (2006.01)

(52) U.S. Cl. ............. 360/244.8; 360/244.9; 360/245.9

(58) Field of Classification Search ............. 360/244.9, 360/244.8, 245.8, 245.9
See application file for complete search history.

(56) References Cited

U.S. PATENT DOCUMENTS

| | | | | |
|---|---|---|---|---|
| 4,797,763 A * | 1/1989 | Levy et al. | ............... | 360/245.6 |
| 5,570,261 A * | 10/1996 | Frater et al. | ............... | 360/244.3 |
| 5,892,637 A * | 4/1999 | Brooks et al. | ............ | 360/234.5 |
| 6,181,525 B1 | 1/2001 | Carlson | .................... | 360/245.7 |
| 6,297,937 B1 | 10/2001 | Schar | ..................... | 360/294.7 |
| 6,335,847 B1 | 1/2002 | Khan et al. | .............. | 360/244.5 |
| 6,351,350 B1 | 2/2002 | Symons et al. | ........... | 360/244.9 |
| 6,392,843 B1 | 5/2002 | Murphy | ................... | 360/245.3 |
| 6,504,684 B1 | 1/2003 | Danielson et al. | ........ | 360/244.8 |
| 6,556,383 B2 | 4/2003 | Murphy et al. | ........... | 360/244.9 |
| 6,667,856 B2 | 12/2003 | Danielson et al. | ........ | 360/244.8 |
| 6,687,094 B2 * | 2/2004 | Liu et al. | ................. | 360/265.7 |
| 6,714,386 B1 | 3/2004 | Polycarpou et al. | ...... | 360/265.1 |
| 6,757,137 B1 * | 6/2004 | Mei | ........................ | 360/245.7 |
| 6,790,133 B2 | 9/2004 | Nuno | ......................... | 451/318 |
| 6,950,285 B2 | 9/2005 | Wada et al. | .............. | 360/265.7 |
| 6,965,501 B1 | 11/2005 | Pan et al. | ................. | 360/245.7 |
| 7,333,299 B2 * | 2/2008 | Wada et al. | .............. | 360/294.7 |
| 7,430,096 B1 * | 9/2008 | Bjorstrom et al. | ........ | 360/244.9 |
| 2006/0250725 A1 * | 11/2006 | Tada et al. | ............... | 360/244.2 |
| 2007/0177307 A1 * | 8/2007 | Fujimoto | ................. | 360/244.2 |
| 2008/0013215 A1 * | 1/2008 | Kido et al. | ............... | 360/244.2 |

* cited by examiner

*Primary Examiner*—Jefferson Evans  
(74) *Attorney, Agent, or Firm*—Leanne Taveggia Farrell; Westman, Champlin & Kelly, P.A.

(57) ABSTRACT

A suspension is disclosed that includes a pre-load section and a load section. The pre-load section is configured to be connected to a base. The load section is connected to the pre-load section and comprises a load beam portion, a flex circuit portion, and a brace. The brace extends laterally exterior to the load beam portion proximate to the pre-load section. The brace increases the lateral sway vibration mode of the load section, allowing the load beam portion to be narrower, and provide a decreased weight and increased torsion vibration mode, while also maintaining an increased lateral sway vibration mode.

18 Claims, 9 Drawing Sheets

BRACED SUSPENSION FOR SUPPORTING A HEAD SLIDER

FIELD

The present subject matter relates generally to suspensions, and more particularly but not by limitation, to suspensions with high shock performance and high track per inch performance.

BACKGROUND

Data storage devices have tended to be made smaller, yet with greater storage capacity, over time. Some applications have led to interest in "micro" disc drives, such as those that are one inch or smaller, and a fraction of an ounce, such as might be well suited to hand-held or otherwise easily portable devices, such as small music players, PDAs, digital still and video cameras, or external computer memory, for example. Adapting data storage technology to perform well in current applications poses considerable technical challenges.

Embodiments of the subject matter disclosed herein provide unforeseen advantages in addressing these and other problems, including promising application in novel data storage systems. The discussion above is merely provided for general background information and is not intended to be used as an aid in determining the scope of the claimed subject matter.

SUMMARY

A suspension is disclosed that includes a pre-load section and a load section. The pre-load section is configured to be connected to a base. The load section is connected to the pre-load section and comprises a load beam portion, a flex circuit portion, and a brace. The brace extends laterally exterior to the load beam portion proximate to the pre-load section. The brace increases the lateral sway vibration mode of the load section, allowing the load beam portion to be narrower, and provide a decreased weight and increased torsion vibration mode, while also maintaining an increased lateral sway vibration mode.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background. Various embodiments provide a wealth of additional and unexpected advantages, beyond the resolution of difficulties with current solutions. A variety of other variations and embodiments besides those illustrative examples specifically discussed herein are also contemplated, and may be discerned by those skilled in the art from the entirety of the present disclosure.

DETAILED DESCRIPTION OF ILLUSTRATIVE EMBODIMENTS

According to one illustrative embodiment, a laterally extending brace is provided to the load section of a suspension, allowing the load beam to be narrower than current suspensions and to increase the lateral sway vibration mode while the narrowness of the load beam provides decreased mass and increased torsion vibration mode. The increased sway and torsion vibration modes increase the precision with which the suspension can keep a read/write head positioned proximate to a data track in an opposing data medium, thereby allowing a greater density of data in the medium, for example. The lighter weight of the load section also lowers the force of any operational shock to the suspension, and increases the capability of the suspension to perform after an operational shock, in an illustrative embodiment.

Figure 1:
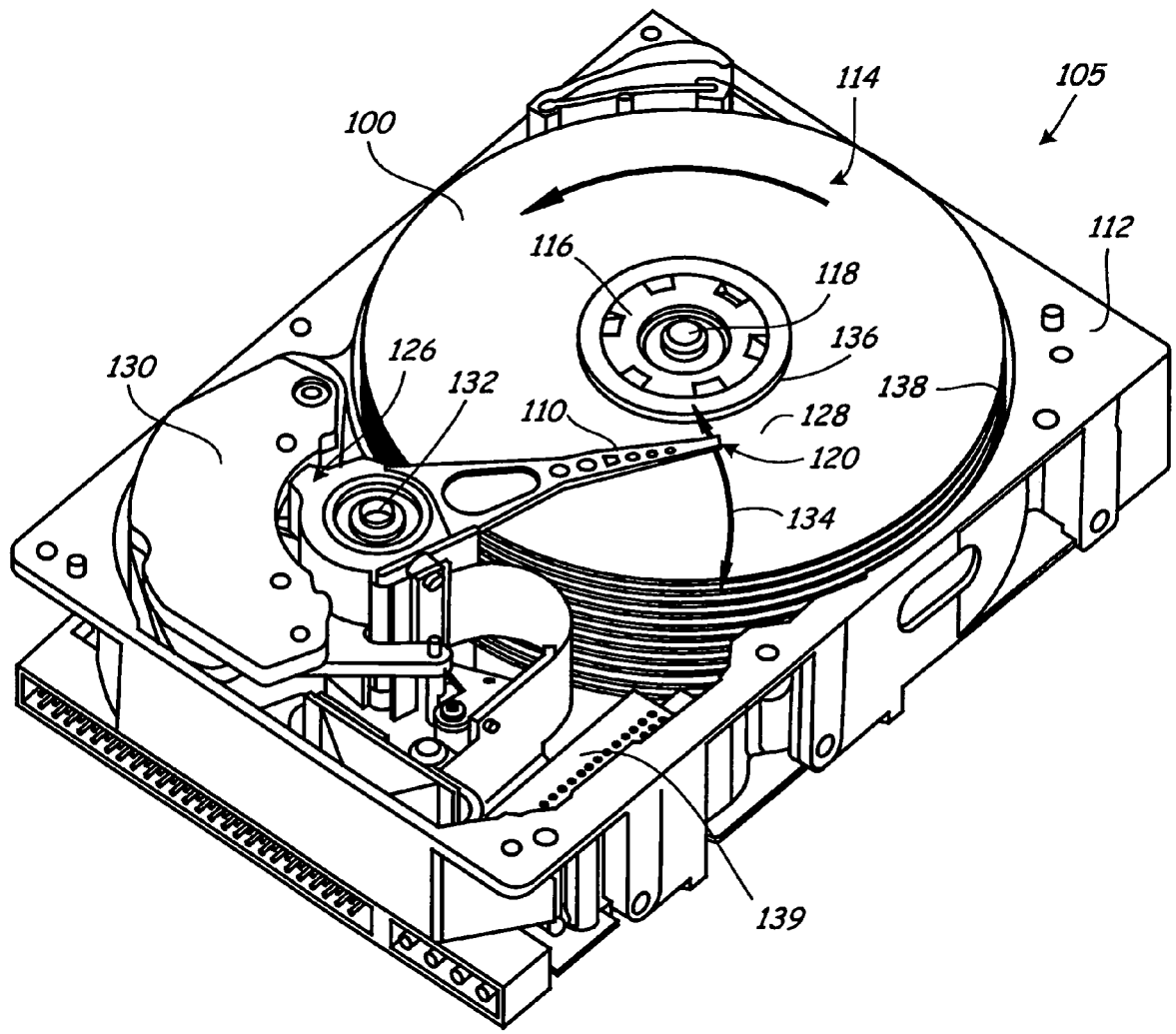
FIG. 1 is an isometric view of a data storage system, according to an illustrative embodiment.

FIG. 1 demonstrates an illustrative embodiment of a data storage system in which a suspension as disclosed herein may be advantageously applied. FIG. 1 is an isometric view of a data storage system 100 as an illustrative system in which various embodiments may be usefully applied. Data storage system 100 includes a housing with a base 102 and a top cover (not shown). Data storage system 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to data storage system 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
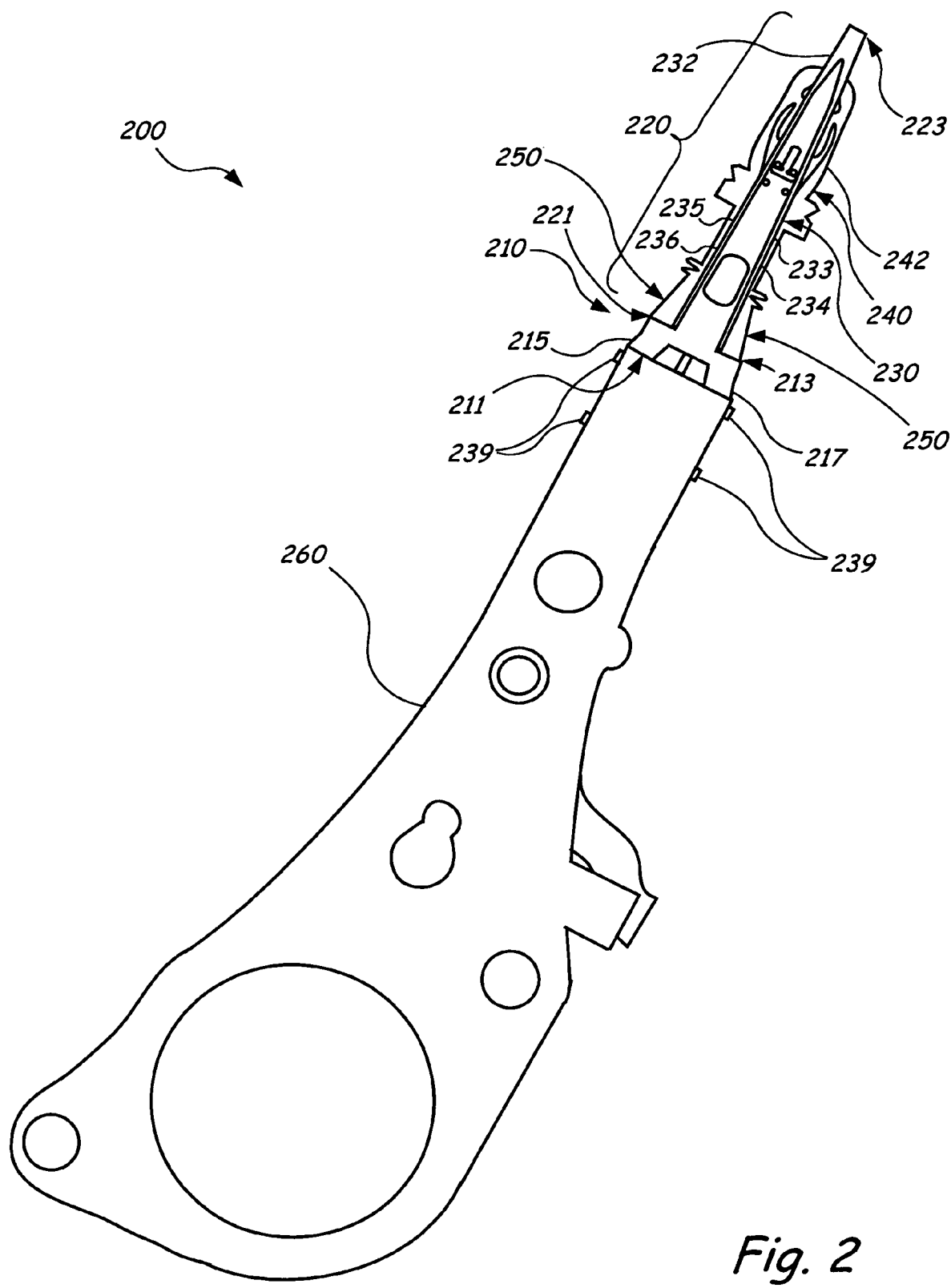
FIG. 2 is a plan view of a suspension, according to an illustrative embodiment.
Figure 3:
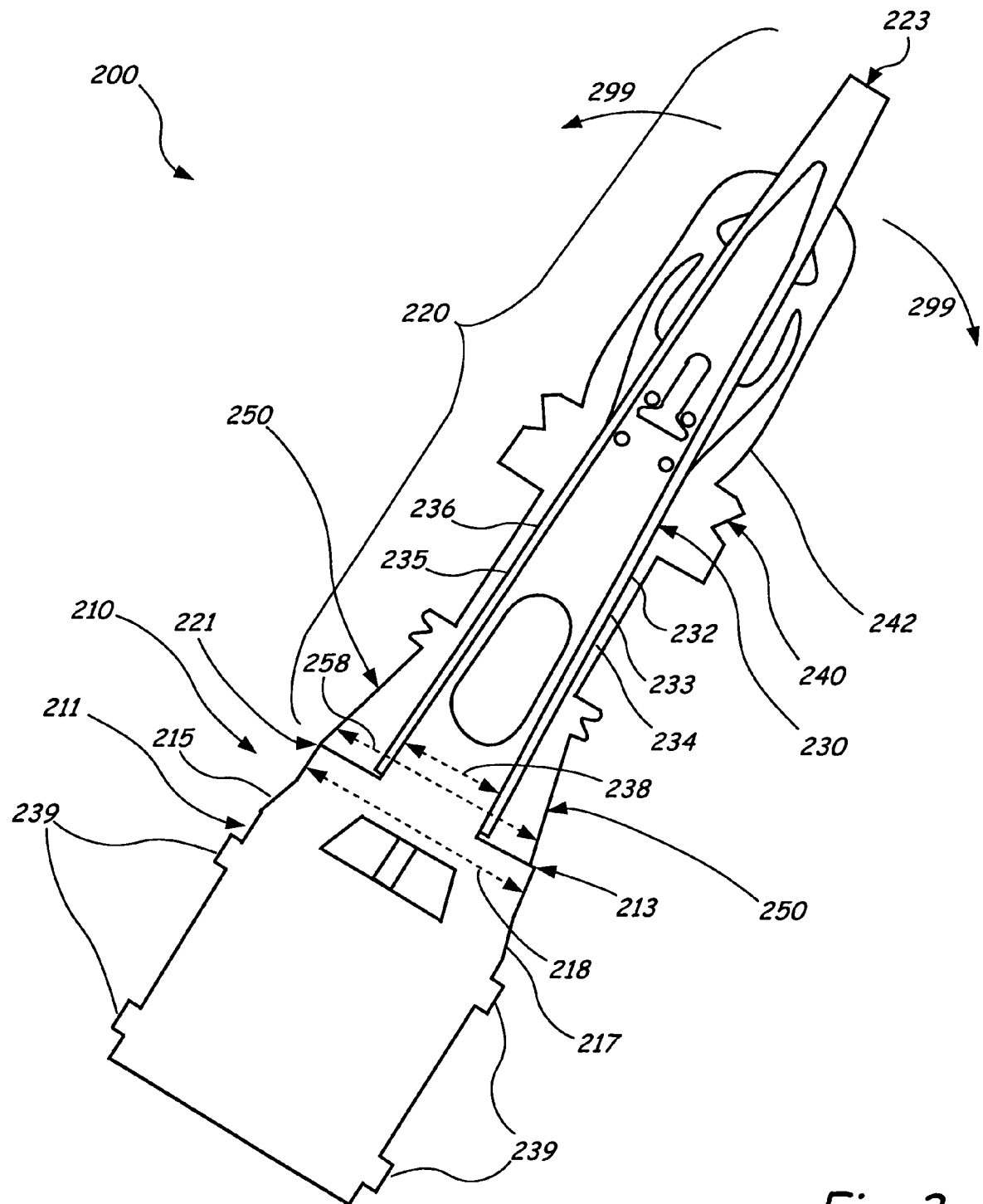
FIG. 3 is a plan view of a suspension, according to an illustrative embodiment.

FIG. 2 depicts a plan view of a suspension 200 attached to an arm 260, according to an illustrative embodiment. FIG. 3 depicts suspension 200 in a closer plan view, without arm 260. Suspension 200 and additional suspensions such as those depicted and described herein may be used as the suspensions 112 in a data storage system 100 such as depicted in FIG. 1. Suspension 200 includes a pre-load section 210 and a load section 220. Suspension 200 also includes a load beam 230 and a flex circuit 240.

The pre-load section has a proximal end 211 and a distal end 213, and is dominated by portions of load beam 230 forming pre-load struts 215, 217. Proximal end 211 is configured to be connected to a base such as arm 260, which may be used as one of the track accessing arms 114 in a data storage system 100 as depicted in FIG. 1. Load section 220 has a first end 221 and a second end 223, the first end being connected to distal end 211 of pre-load section 210. A portion 232 of load beam 230 and a portion 242 of flex circuit 240 are included in the load section 220 of the suspension 200. Flex circuit portion 242 is attached to load beam portion 232 substantially vertically adjacent to it—below it through the page, as seen in the view of FIGS. 2 and 3, according to the present illustrative embodiment.

The load beam portion 232 substantially extends between first end 221 and second end 223 of load section 220. That is, load beam portion 232 extends along a substantial part of load section 220—in this embodiment, from one end to the other—and load beam 230 also extends beyond the end of load beam portion 232, going from load section 220 through pre-load section 210 and overlapping and connecting to arm 260. Tabs 239 of load beam 230 are used to attach load beam 230 to arm 260 during assembly of a data storage system, when panel 231 of load beam 230, as depicted in FIG. 3, is attached to arm 260, such as by welding, for example. Load beam 230 has lateral edges 233, 235 in load section 220, defining a lateral width 238 between them. Load beam portion 232 includes rails 234, 236 along lateral edges 233, 235 in this illustrative embodiment. The lateral width 238 of load beam portion 232 is significantly less than in typical suspensions, and is less than the lateral width 218 of the pre-load section 210, so that the load beam portion 232 is substantially laterally narrower than the pre-load section 210. This substantially narrower width 238 is such that it provides the load beam portion 232 with significantly less weight and a significantly higher torsion vibration mode than load beam portion 232 would have if its width at its connection with pre-load portion 210 were close to the width of pre-load portion 210, for example; of if its width were similar to the width of many current suspensions. The lighter weight provides substantial advantages. As one example, if a data storage system in which the suspension 200 is used is subjected to an operational shock, or a mechanical shock during operation, the lesser mass of load beam portion results in less force exerted on load section 220, thereby helping to prevent a read/write head mounted on load section 220 from crashing into a data medium proximate to the read/write head, an event that can cause catastrophic effects.

The load section 220 of suspension 200 also includes a brace 250. Brace 250 extends along a part of the load section 220 proximate to the pre-load section 210, and intersects pre-load section 210, in this illustrative embodiment. Brace 250 has a lateral width, indicated as width 258, that is greater than the lateral width 238 of the load beam portion 232. Brace 250 thereby extends laterally exterior to the lateral edges 233, 235 of load beam portion 232. Brace 250 provides this greater lateral width proximate to pre-load section 210, from where it intersects pre-load section 210 along a significant fraction of the length of load section 220. The lateral width of brace 250 is closer to the lateral width of the pre-load section 210 where the two intersect, and from there it tapers to a lesser width at a distal end of the brace 250 from the pre-load portion 210, in this illustrative embodiment.

Brace 250 provides substantial advantages, such as increased lateral sway vibration modes for suspension 200. Brace 250 thereby may compensate for the narrowness of load beam portion 232, and allow a combined suspension 200 that optimizes both weight and torsion modes, due in part to the relative lateral narrowness of load beam portion 232, and sway modes, due in part to the added lateral support of brace 250. Suspension 200 therefore solves long-standing problems in suspension design, in which improved torsion mode typically was accompanied by decreased sway mode, and increased sway mode was accompanied by decreased torsion mode. By improving both modes together, new advantages are achieved in providing precision tracking of data tracks on a proximate data medium by a read/write head mounted on suspension 200, and greater data storage can be achieved in a smaller size, an urgent priority in many current applications.

Brace 250 is integrated as part of flex circuit 240 in the illustrative embodiment of FIGS. 2 and 3. Additional examples of some of the variations contemplated are depicted in other embodiments, described below. Flex circuit 240 extends from load section 220 through pre-load section 210, in this embodiment. Brace 250 is integrated with flex circuit portion 242 in load section 220 and the portion of flex circuit 240 extending through pre-load section 210. Flex circuit portion 242 is attached to load beam portion 232, and flex circuit 240 is also attached to load beam 230 in pre-load section 210.

Figure 4:
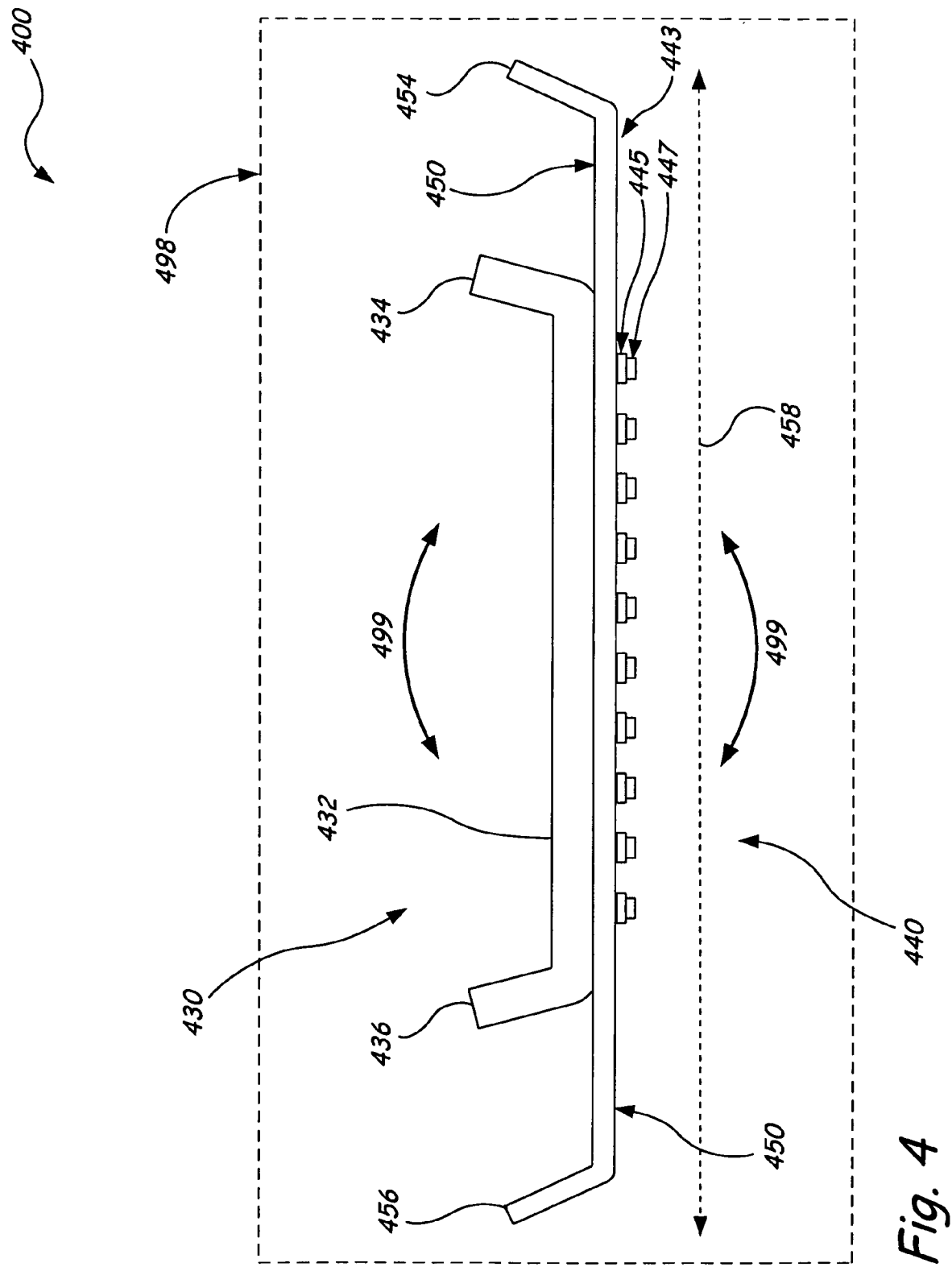
FIG. 4 is a cross-sectional view of a suspension, according to an illustrative embodiment.

FIG. 4 is a cross-sectional view of a load section of a suspension 400, according to an illustrative embodiment similar in many ways to suspension 200. The cross-sectional slice depicted in FIG. 4 is related to the greater suspension 400 is depicted as cross-section 498 in FIG. 5. While the direction of the lateral sway vibration modes of suspension 200 is depicted at 299 in FIG. 3, the direction of torsion vibration modes of suspension 400 is depicted at 499 in FIG. 4. Suspension 400 further illustrates certain characteristics of a load beam 430, a flex circuit 440 and a brace 450. Flex circuit 440 provides signal layer 447 that provides signal lines between the read/write head mounted on suspension 400 and the associated data storage system such as data storage system 100 of FIG. 1. In an illustrative embodiment, flex circuit 440 includes a support layer 443, a substrate layer 445, and a signal layer 447, where each layer may include complex morphologies due to processes such as etching. In one illustrative example, the support layer 443 may be composed of stainless steel with a thickness of twenty microns or less; the substrate layer 445 may be composed of a polyimide with a thickness of ten microns or less; and the signal, layer 447 may be composed of copper with a thickness of twelve microns or less. Each of these layers 443, 445, 447 may also have a greater thickness than these examples, and each may also be composed of other materials instead of or in addition to the examples above; for instance, the support layer 443 may otherwise be composed of aluminum, titanium, or beryllium, among other options; the substrate layer 445 may otherwise be composed of any plastic or other insulator, among other options; and the signal layer 447 may otherwise be composed of any substance capable of carrying a signal, such as gold, silver, another conducting material, a superconducting material, or a fiber-optic material, among other options. The signal layer 447 may be separated into several signal lines, and the substrate layer 445 may be separated into separate substrates supporting the separate signal lines.

In the present illustrative embodiment, the brace 450 may be composed of only the support layer 443 of the flex circuit 440, such as a stainless steel layer, for example. Support layer 443 is significantly thinner than load beam portion 432. Support layer 443 therefore has less areal density than load beam portion 432, and forming brace 450 out of support layer 443 provides for a suspension load section of lesser weight than if load beam portion 432 extended through the full lateral width 458 of brace 450, as in the present embodiment. Brace 450 therefore provides enhanced lateral sway support and higher sway modes for suspension 400 while also enabling the narrower load beam portion 432 to provide for lighter weight and higher torsion modes, in this illustrative embodiment.

Load beam portion 432 includes rails 434, 436 disposed along its lateral edges in this illustrative embodiment. Brace 450 extends laterally exterior to rails 434, 436, and also includes rails 454, 456 on its edges, in this illustrative embodiment. Brace 450 extends substantially coplanar with load beam portion 432, in that they both extend with a common plane defined by their substantially parallel length and width dimensions. In other embodiments, such as in suspension 200, the brace 250 does not include rails. This second pair of rails 454, 456 may provide added stiffness in some embodiments such as that of FIG. 4, thereby further increasing the lateral sway modes in suspension 400. In other embodiments such as suspension 200, the flat edges and lack of rails of brace 250 may provide more advantageous characteristics for certain applications.

Figure 5:
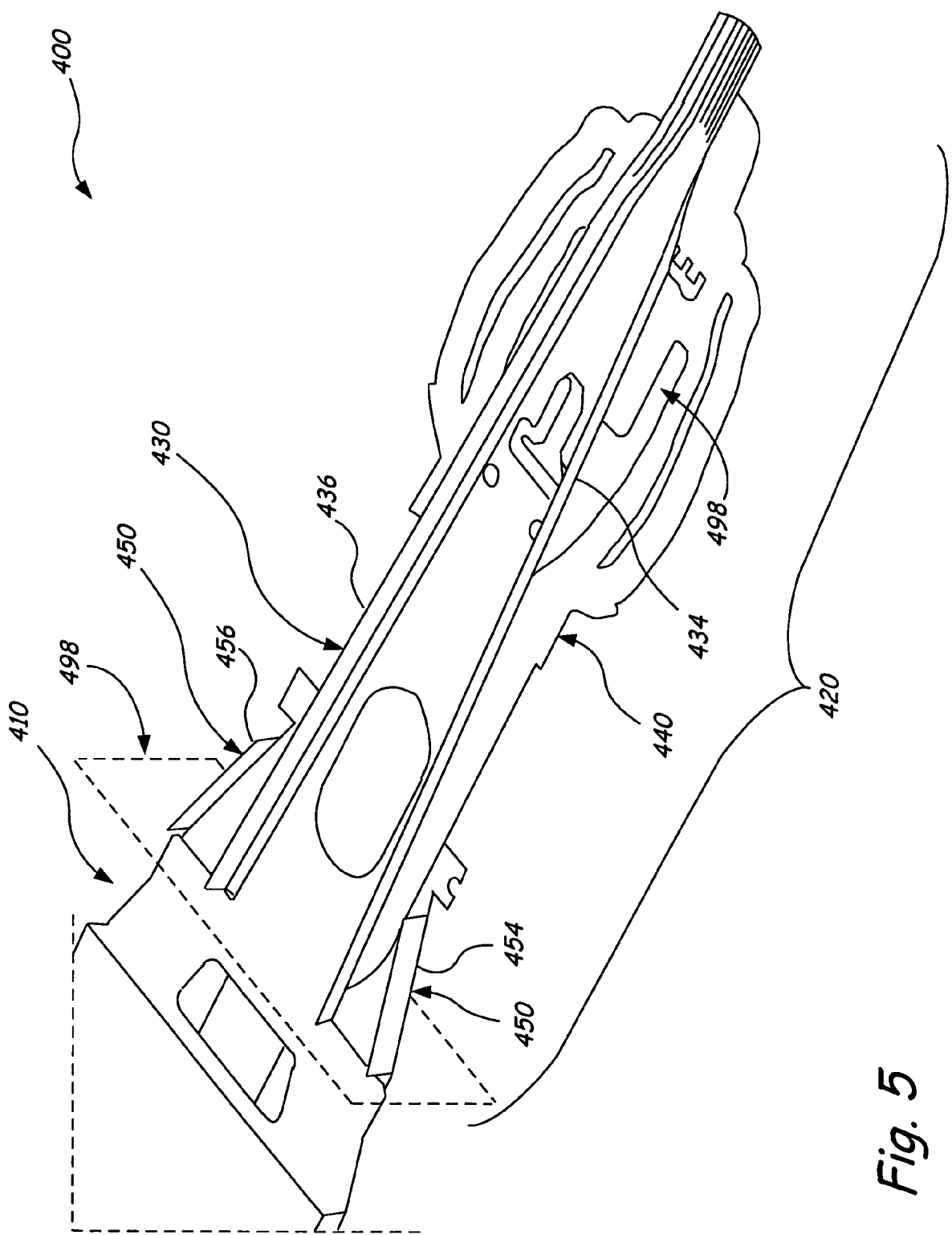
FIG. 5 is a perspective view of a suspension, according to an illustrative embodiment.

FIG. 5 is a perspective view of suspension 400 of FIG. 4, according to an illustrative embodiment. FIG. 5. depicts the cross-sectional slice 498 depicted in FIG. 4 as it relates to the greater suspension 400. FIG. 5 provides another depiction of suspension 400, including pre-load section 410; load section 420; load beam 430; flex circuit 440; brace 450; rails 434, 436 on the lateral edges of load beam portion 432 in load section 420; rails 454, 456 on the lateral edges of brace 450; and arm 460 to which suspension 400 is configured to be connected. A read/write head may be mounted to suspension 400 on its underside, obscured from view in FIG. 5, in the area indicated by 497.

Figure 6:
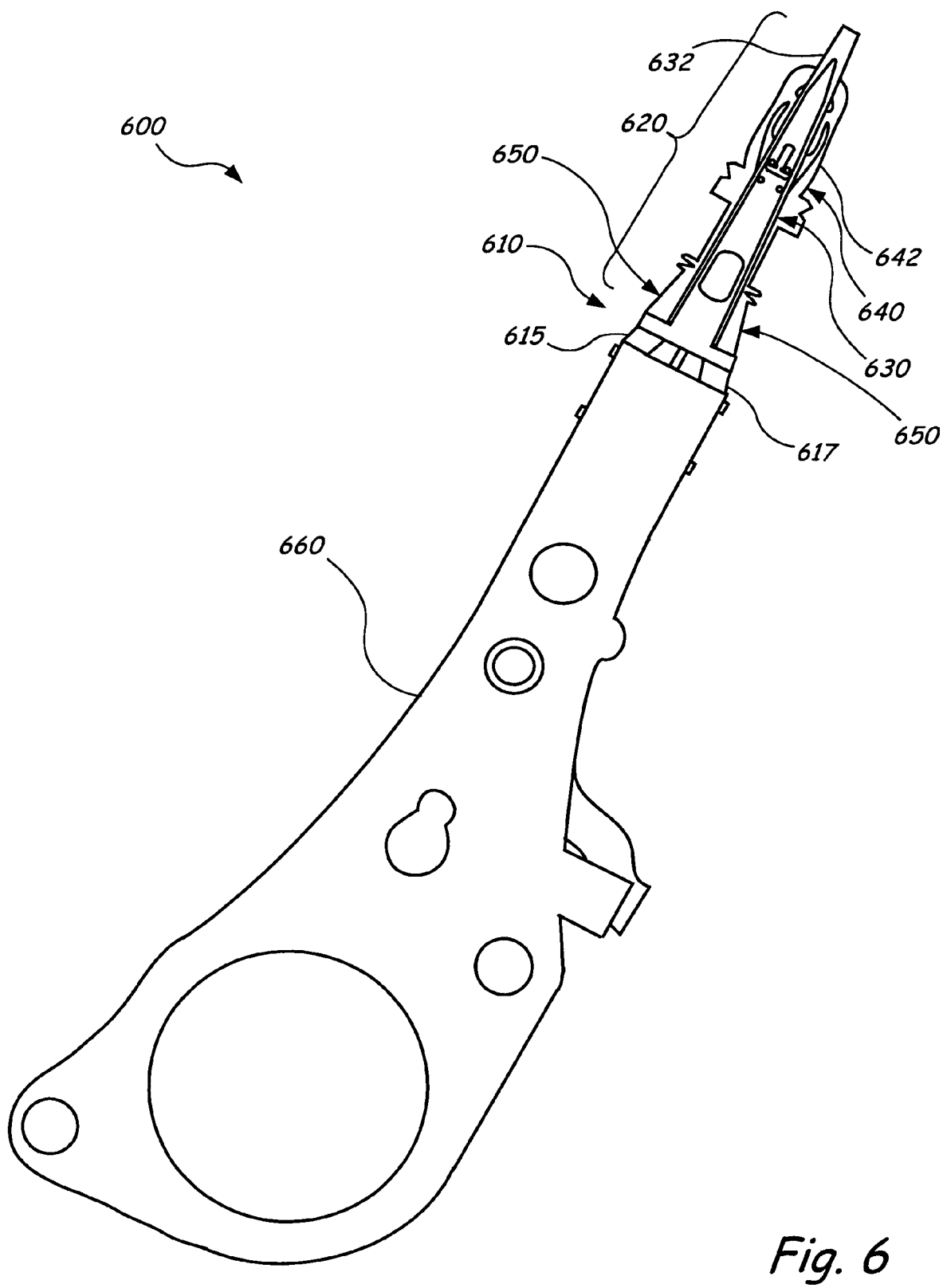
FIG. 6 is a plan view of a suspension, according to an illustrative embodiment.
Figure 7:
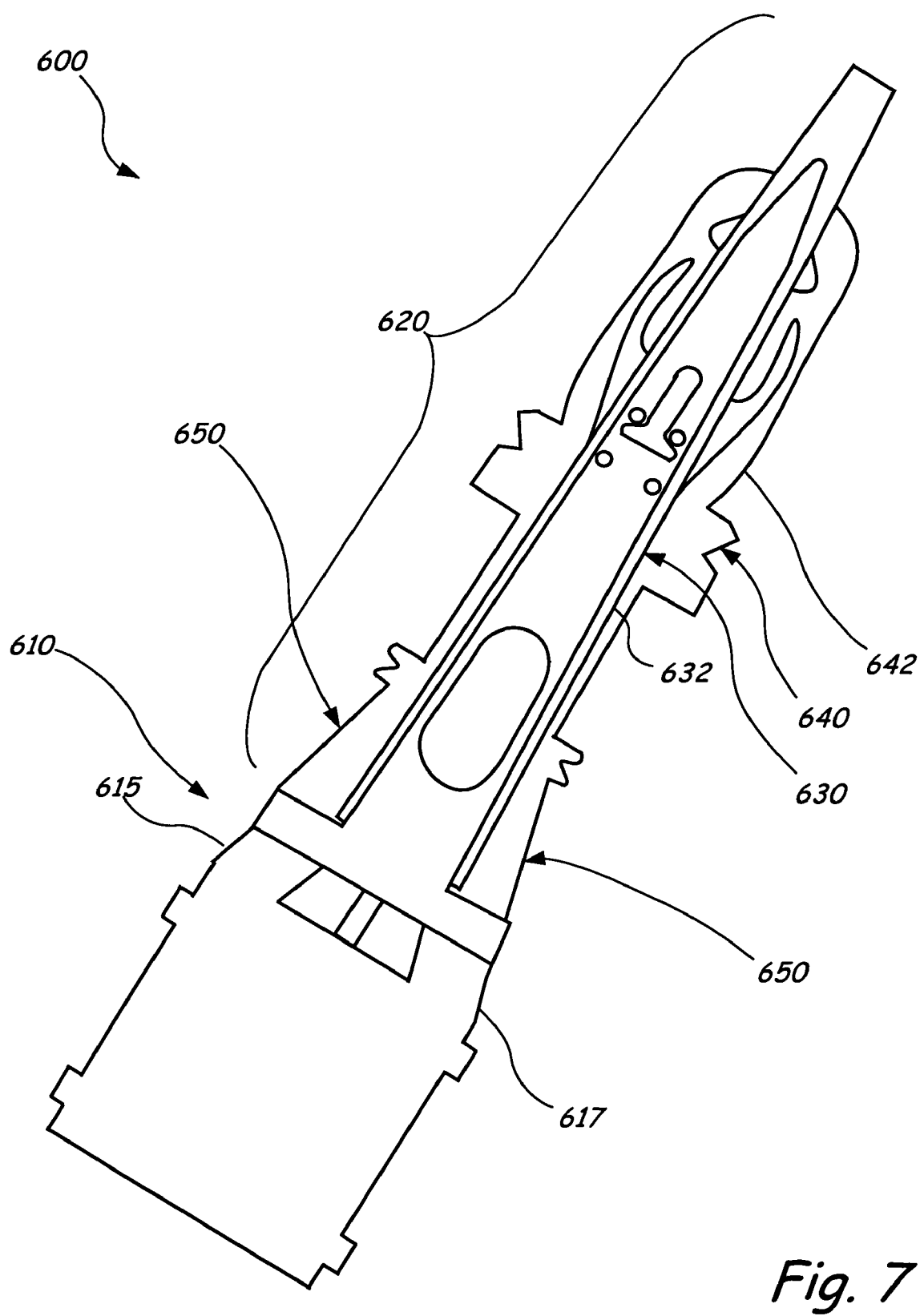
FIG. 7 is a plan view of a suspension, according to an illustrative embodiment.

FIG. 6 is a plan view of a suspension 600 according to another illustrative embodiment, connected to arm 660. FIG. 7 depicts a closer view of suspension 600. In suspension 600, flex circuit 640 includes flex circuit portion 642 and brace 650 in the load section 620, and flex circuit 640 extends through pre-load section 610 in two pre-load struts 615, 617, and is configured to be connected to arm 660. The substrate and signal layers of the flex circuit may be separate from the support layer of the flex circuit through some sections, such as in pre-load section 610. The load beam 630 of suspension 600 includes only the load beam portion 632 comprised within load section 620, so that load beam portion 632 ends at pre-load section 610. The pre-load section is therefore formed mainly of the flex circuit 640 in this illustrative embodiment, rather than of the load beam 630 as in the embodiments of suspensions 200 and 400. This provides for certain other advantages such as a lighter weight through the pre-load section 610 and therefore a lighter overall weight of suspension 600.

Figure 8:
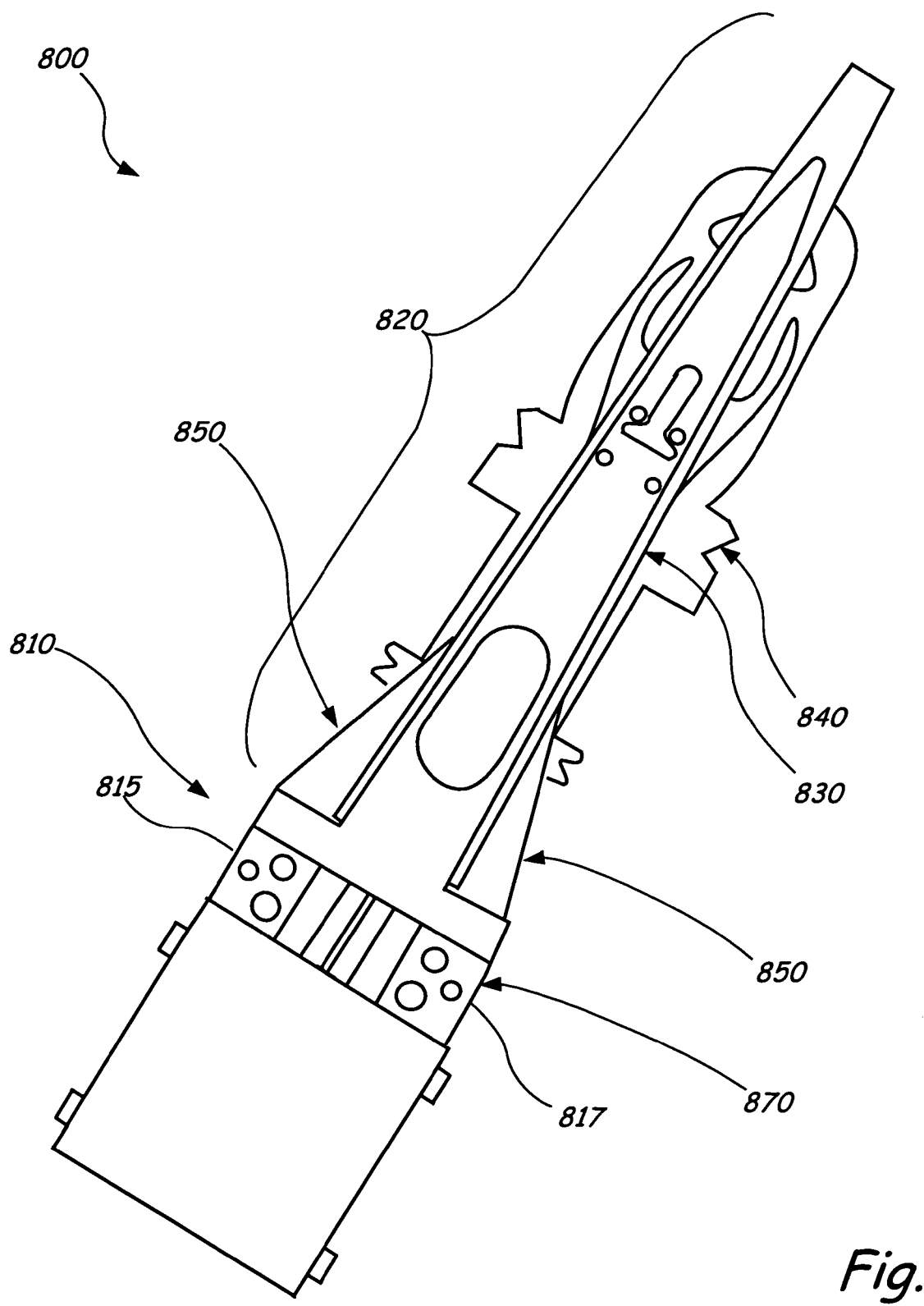
FIG. 8 is a plan view of a suspension, according to an illustrative embodiment.

FIG. 8 is a plan view of yet another suspension 800 according to another illustrative embodiment, which includes a separate hinge 870 attached to the load beam 830, and wherein the brace 850 is composed of and integrated with a section of the hinge 870 rather than of the flex circuit 840. Hinge 870 extends through pre-load section 810 in two pre-load struts 815, 817, which have holes in them for managing mass and vibration modes. Hinge 870 also extends through part of load section 820, where it may attach to load beam 830 and/or flex circuit 840, in various embodiments, and in which it forms brace 850 as part of hinge 870. Hinge 870 thereby provides a separate component besides flex circuit 840 or load beam 830 which increases the lateral sway vibration modes of suspension 800, allowing for the use of a narrower load beam 830 and its advantageously lower weight and higher torsion modes, while also ensuring high lateral sway modes. While suspensions 200, 400 and 600 featured a brace that was integrated with a flex circuit portion and that may be vertically thinner than the load beam portion, hinge 870 and brace 850 may be vertically thicker than load beam, according to the present illustrative embodiment. In still other embodiments, a flex circuit brace may be vertically thicker than an accompanying load beam and a hinge brace may be thinner than an accompanying load beam. The relatively thicker hinge 870 may provide additional vertical stiffness and the relatively thicker brace 850 may provide additional lateral stiffness, which may be advantageous in applications in which the anticipated operational shock risks are relatively high, and/or a higher pre-load is desired, for example.

Figure 9:
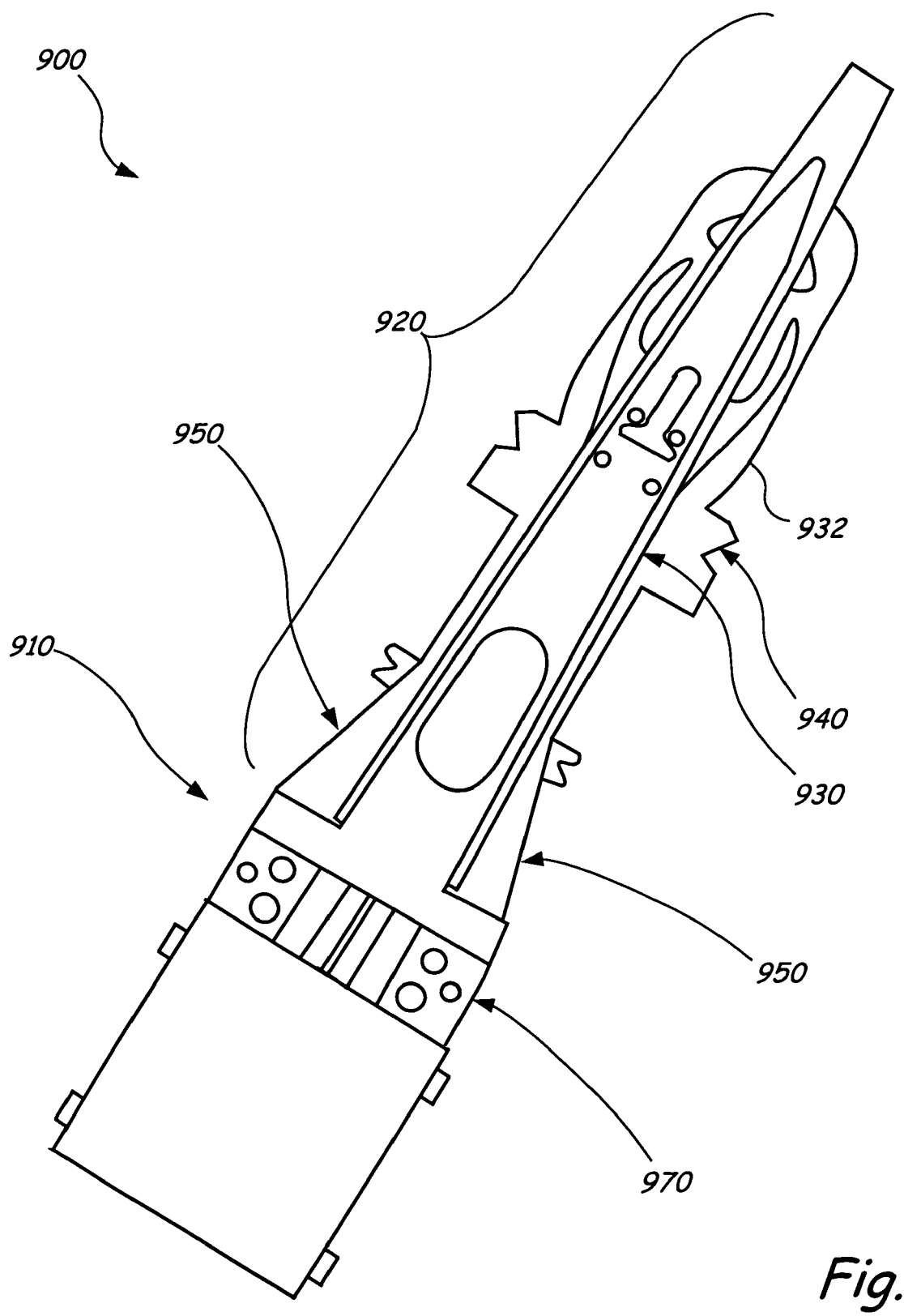
FIG. 9 is a plan view of a suspension, according to an illustrative embodiment.

FIG. 9 is a plan view of yet another suspension 900 according to yet another illustrative embodiment, in which a hinge 970 is included as a separate component that is attached to the load beam 930, and in which the brace 950 is composed of and integrated with flex circuit portion 942, the portion of flex circuit 940 in load section 920. Again, as in suspension 800, this provides additional vertical stiffness and allows for relatively greater pre-load, for applications in which this is desired, while suspension 900 still provides a relatively lighter and vertically thinner laterally extending brace 950 proximate to pre-load portion 910, therefore minimizing the weight and torsion modes of the load section 920 while still providing additional lateral support and increasing lateral sway modes, for example. As in many of the other embodiments, brace 950 of suspension 900 provides a means for increasing the lateral sway vibration mode of the load section 920, while providing a lower mass and a higher torsion vibration mode of the load section 920 than if the lateral width of the load beam portion 930 were increased.

These embodiments are therefore indicative of a great variety of options and embodiments included in the present subject matter, which may also include any combination of the various components and features described and depicted in the various embodiments herein along with additional aspects that will be apparent to those skilled in the art from the present description and figures.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the suspension while maintaining substantially the same functionality without departing from the scope and spirit of the present invention. In addition, although the embodiments described herein are directed to a suspension for data storage system, it will be appreciated by those skilled in the art that the teachings of the present invention can be applied to any application involving a suspension for ensuring a precise position of a subject mounted on the suspension, without departing from the scope and spirit of the present invention.

What is claimed is:

1. A suspension comprising:
   a pre-load section, having a proximal end and a distal end, the proximal end configured to be connected to a base; and
   a load section, having a first end and a second end, the first end connected to the distal end of the pre-load section, wherein the load section comprises:
      a load beam portion, substantially extending between the first end and the second end of the load section;
      a first pair of rails disposed along lateral edges of the load beam portion;
      a flex circuit portion, substantially vertically adjacent to the load beam portion;

at least one brace extending exterior to the rails proximate to the pre-load section; and a second pair of rails disposed on the brace, laterally exterior to at least a portion of the first pair of rails.

2. The suspension of claim 1, wherein the brace is integrated with the flex circuit portion.

3. The suspension of claim 1, wherein the flex circuit comprises a support layer, a substrate layer, and a signal layer, and the brace comprises the support layer.

4. The suspension of claim 1, wherein the load beam portion is substantially laterally narrower than the pre-load section.

5. The suspension of claim 1, wherein the brace extends substantially coplanar with the load beam portion.

6. The suspension of claim 1, wherein the load beam portion is comprised in a load beam that extends through the pre-load section and is configured to be connected to a base.

7. The suspension of claim 1, wherein the brace is provided as an integral portion of the flex circuit portion.

8. The suspension of claim 1, further comprising a hinge extending through the pre-load section and a part of the load section.

9. The suspension of claim 8, wherein the brace is integrated with the hinge.

10. The suspension of claim 8, wherein the brace is integrated with the flex circuit portion.

11. The suspension of claim 1, wherein the brace is vertically thinner than the load beam portion.

12. The suspension of claim 1, further comprising a data storage system that comprises a medium having data tracks, and an actuable arm, wherein the suspension is mounted on the arm such that it is capable of suspending a read/write head in proximity to the data tracks.

13. A suspension, having a pre-load section configured to be mounted on an arm, and a load section attached to the pre-load section and configured for a read/write head to be mounted thereto, the suspension comprising:

a load beam, having a lateral width defined between opposing lateral edges of the load section that is less than a lateral width of the pre-load section;

a first pair of rails, disposed along the lateral edges of the load beam;

a brace, extending along a part of the load section exterior to the first pair of rails and intersecting the pre-load section, wherein the brace has a lateral width that is greater than the lateral width of the load beam; and a second pair of rails located along lateral edges of the brace.

14. The suspension of claim 13, wherein the lateral width of the brace where it intersects the pre-load section, is closer to the lateral width of the pre-load section that to the lateral width of the load beam in the load section.

15. The suspension of claim 13, wherein the lateral width of the brace tapers from a greater width where it intersects the pre-load section to a lesser width at a distal end of the brace.

16. The suspension of claim 13, wherein the second pair of rails is disposed at an angle to the first pair of rails.

17. The suspension of claim 13, wherein the brace is integrated with the hinge.

18. The suspension of claim 13, wherein the brace is integrated with the flex circuit portion.

* * * * *